United States Patent
Zhang et al.

(10) Patent No.: US 10,621,456 B2
(45) Date of Patent: Apr. 14, 2020

(54) DISTANCE MEASUREMENT METHOD AND APPARATUS, AND UNMANNED AERIAL VEHICLE

(71) Applicant: AUTEL ROBOTICS CO., LTD., Shenzhen, Guangdong (CN)

(72) Inventors: Ke Zhang, Guangdong (CN); Bo Zang, Guangdong (CN)

(73) Assignee: AUTEL ROBOTICS CO., LTD., Shenzhen, Guangdon (CN)

(*) Notice: Subject to any disclaimer, the term of this patent is extended or adjusted under 35 U.S.C. 154(b) by 107 days.

(21) Appl. No.: 15/886,186

(22) Filed: Feb. 1, 2018

(65) Prior Publication Data

US 2019/0197335 A1 Jun. 27, 2019

Related U.S. Application Data

(63) Continuation of application No. PCT/CN2017/118266, filed on Dec. 25, 2017.

(51) Int. Cl.
*G06K 9/32* (2006.01)
*G05D 1/00* (2006.01)
(Continued)

(52) U.S. Cl.
CPC .......... *G06K 9/3233* (2013.01); *B64C 39/024* (2013.01); *G05D 1/0094* (2013.01);
(Continued)

(58) Field of Classification Search
CPC ............ G06K 9/3233; G06K 9/00651; G05D 1/0094; B64C 39/024; B64C 2201/127
(Continued)

(56) References Cited

U.S. PATENT DOCUMENTS 9,549,125 B1 * 1/2017 Goyal ............... H04N 21/4728
10,074,183 B1 * 9/2018 Watson ................. B64C 39/024
(Continued)

FOREIGN PATENT DOCUMENTS

| CN | 105225241 A | 1/2016 |
|---|---|---|
| CN | 106529495 A | 3/2017 |

(Continued)

OTHER PUBLICATIONS

Abdulla Al-Kaff, et al; "Obstacle Detection and Avoidance System Based on Monocular Camera and Size Expansion Algorithm for UAVs", Sensors (Basel) May 7, 2017, 17(5); 22 pages.
(Continued)

*Primary Examiner* — Tung T Vo
(74) *Attorney, Agent, or Firm* — Ladas & Parry LLP; Frank Gao

(57) ABSTRACT

The present invention discloses a distance measurement method and apparatus, and an unmanned aerial vehicle using same. According to the distance measurement method and apparatus, and the unmanned aerial vehicle provided in embodiments of the present invention, foreground and background segmentation is performed on two neighboring frames of images, and edge feature extraction is performed by using enlarged regions of interest (ROIs) to obtain measurement changes of the images. By means of the measurement changes of the images, remote-distance obstacle avoidance in an extreme condition can be implemented, and problems such as poor stereo matching precision or unavailability of stereo matching in extreme cases such as no texture, low textures, and dense and repeated textures are resolved.

16 Claims, 7 Drawing Sheets

(51) Int. Cl.
*B64C 39/02* (2006.01)
*G06K 9/00* (2006.01)

(52) U.S. Cl.
CPC ....... *G06K 9/0063* (2013.01); *G06K 9/00651* (2013.01); *B64C 2201/127* (2013.01)

(58) Field of Classification Search
USPC ................................................ 348/148, 144
See application file for complete search history.

(56) References Cited

U.S. PATENT DOCUMENTS

| | | | |
|---|---|---|---|
| 10,196,141 B1* | 2/2019 | Cui | B64C 39/024 |
| 10,234,873 B2* | 3/2019 | Li | B64D 47/08 |
| 2016/0004923 A1* | 1/2016 | Piekniewski | G02B 5/204 348/302 |
| 2016/0373662 A1* | 12/2016 | Olsen | G06K 9/0063 |
| 2017/0083748 A1* | 3/2017 | Zhou | G06T 7/248 |
| 2017/0178357 A1* | 6/2017 | Yang | G06T 7/269 |
| 2017/0193830 A1 | 7/2017 | Fragoso et al. | |
| 2017/0221226 A1* | 8/2017 | Shen | G06T 7/80 |
| 2017/0293796 A1* | 10/2017 | Li | B64C 39/024 |
| 2017/0301111 A1* | 10/2017 | Zhao | G01C 25/005 |
| 2017/0308103 A1* | 10/2017 | Li | B64D 47/08 |
| 2017/0314930 A1 | 11/2017 | Monterroza et al. | |
| 2017/0351900 A1* | 12/2017 | Lee | H04N 5/2257 |
| 2017/0358103 A1* | 12/2017 | Shao | G01S 3/00 |
| 2017/0371353 A1* | 12/2017 | Millinger, III | G05D 1/101 |
| 2018/0054604 A1* | 2/2018 | Boyd | H04N 13/239 |
| 2018/0246529 A1* | 8/2018 | Hu | G05D 1/0202 |
| 2018/0284777 A1* | 10/2018 | Li | G06T 7/20 |
| 2019/0011921 A1* | 1/2019 | Wang | G05D 1/12 |
| 2019/0030475 A1* | 1/2019 | Witchey | B01D 46/0031 |
| 2019/0034693 A1* | 1/2019 | Zang | G06T 7/11 |
| 2019/0064794 A1* | 2/2019 | Chen | G05D 1/0016 |
| 2019/0087635 A1* | 3/2019 | Klaus | G06K 9/0063 |
| 2019/0096069 A1* | 3/2019 | Qian | G06T 7/74 |

FOREIGN PATENT DOCUMENTS

| | | |
|---|---|---|
| CN | 106960454 A | 7/2017 |
| WO | 2015/175201 A1 | 11/2015 |
| WO | 2017/143589 A1 | 8/2017 |

OTHER PUBLICATIONS

Jaysinh Sagar et al; "Obstacle avoidance by combining background subtraction, optical flow and proximity estimation", Proceedings of the International Micro Air Vehicle Conference and Competition, 2014, Aug. 12, 2014, pp. 142-149.

International Search Report dated Aug. 30, 2018; PCT/CN2017/118266.

Supplementary European Search Report completed Dec. 6, 2018; EP17832901.

* cited by examiner

DISTANCE MEASUREMENT METHOD AND APPARATUS, AND UNMANNED AERIAL VEHICLE

CROSS REFERENCE

This application is a continuation of International Application No. PCT/CN2017/118266, filed on Dec. 25, 2017, the disclosure of which is hereby incorporated by reference in its entirety.

TECHNICAL FIELD

The present invention relates to the technical field of unmanned aerial vehicles, and in particular, to a distance measurement method and apparatus, and an unmanned aerial vehicle using same.

RELATED ART

At present, in an autonomous return process, an unmanned aerial vehicle generally performs remote-distance obstacle avoidance in a monocular stereo vision obstacle avoidance manner. Position and attitude changes and corresponding image information of the unmanned aerial vehicle in a flight time interval are obtained, and stereo matching is performed on a corrected and aligned image, so as to obtain depth information of each point in the image. That is, when there is a target in a particular distance ahead and the image changes as the unmanned aerial vehicle flies, stereo matching is performed on information of each point in two neighboring frames of the image, so that an instant position of the target relative to the unmanned aerial vehicle can be obtained, thereby implementing early warning and taking obstacle avoidance strategies.

It should be noted that although stereo matching algorithms have been quite mature, for local matching algorithms such as Sum of Squared Differences (SSD), Sum of Absolute Differences (SAD), and Census and global matching algorithms such as dynamic programming, belief propagation, and simulated annealing, pixel information of images needs to be used. The local matching algorithms and global matching algorithms obtain information about an actual distance of the target relative to the unmanned aerial vehicle by searching for the same pixel points in two images, thereby obtaining a disparity map for describing depth information of the points by using image positions corresponding to the same pixel points, and a corresponding position change. According to such a matching principle, a difference between an image pixel point and a neighboring pixel point becomes an important factor for determining the matching precision and even for determining whether matching can succeed. However, for some cases, for example, extreme cases such as low textures and even no texture, and dense and repeated textures caused by weather factors or brightness, mismatching is easily caused by using the remote-distance obstacle avoidance method, leading to non-availability of the obstacle avoidance method.

SUMMARY

According to a first aspect, to resolve technical problems of the present invention, the present invention provides a distance measurement method, where the method includes:
obtaining two neighboring frames of images that are photographed by an unmanned aerial vehicle;
determining a first region of interest (ROI) of each of the two neighboring frames of images;
determining that the unmanned aerial vehicle cannot determine a distance between the unmanned aerial vehicle and a target in a flight direction of the unmanned aerial vehicle by using a stereo matching method;
enlarging the first ROI of each of the two neighboring frames of images, to form a second ROI; and
respectively extracting foregrounds in the second ROIs from the two neighboring frames of images; and determining the distance between the unmanned aerial vehicle and the target according to the foregrounds respectively extracted from the two neighboring frames of images.

In an embodiment of the present invention, the determining that the unmanned aerial vehicle cannot determine a distance between the unmanned aerial vehicle and a target by using a stereo matching method includes:
selecting n×n pixel units from the first ROI as a cell, and calculating a sum $g_0$ of grayscale values of the n×n pixel units;
selecting n×n cells around the cell as a block, and respectively calculating grayscale values $g_1, g_2, \ldots,$ and $g_{n*n}$ of the n×n cells in the block;
determining whether the sum of the grayscale values of the n×n pixel units and the grayscale values of the n×n cells in the block satisfy a preset condition; and
if yes, determining that the unmanned aerial vehicle cannot determine the distance between the unmanned aerial vehicle and the target by using the stereo matching method.

In an embodiment of the present invention, the determining whether the sum of the grayscale values of the n×n pixel units and the grayscale values of the n×n cells in the block satisfy a preset condition includes:
calculating a ratio of a sum of differences between the grayscale values of all the cells in the block and g0 to a size of the cell:

$$\frac{(g_1 - g_0) + (g_2 - g_0) + \ldots (g_{n \times n} - g_0)}{S_{cell}},$$

where
$S_{cell}$ is the size of the cell;
determining whether the ratio falls within a preset range; and
if yes, determining that the unmanned aerial vehicle cannot determine the distance between the unmanned aerial vehicle and the target by using the stereo matching method.

In an embodiment of the present invention, a ratio of a size of the second ROI to a size of the first ROI is greater than 1.

In an embodiment of the present invention, the method further includes:
determining whether at least two targets exist in the foreground; and
if yes, determining that one of the at least two targets is a detection object; and
the determining the distance between the unmanned aerial vehicle and the target according to the foregrounds respectively extracted from the two neighboring frames of images includes:
determining a distance between the unmanned aerial vehicle and the detection object according to the foregrounds respectively extracted from the two neighboring frames of images.

In an embodiment of the present invention, the determining that one of the at least two targets is a detection object includes:

determining whether measurement changes of the at least two targets in the foreground are the same; and if yes, determining that a target having a highest upper edge in the foreground is the detection object.

In an embodiment of the present invention, the method further includes:

if the measurement changes of the at least two targets in the foreground are different, determining that a target having a largest edge measurement change in the foreground is the detection object.

In an embodiment of the present invention, the target is a static target, and the determining the distance between the unmanned aerial vehicle and the target according to the foregrounds respectively extracted from the two neighboring frames of images includes:

determining the distance according to at least h1, h2, f, and S, where

S is a flight distance of the unmanned aerial vehicle when the two neighboring frames of images are photographed, f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

In an embodiment of the present invention, the determining the distance according to h1, h2, f, and S includes:

calculating the distance H between the unmanned aerial vehicle and the target according to the following formula:

$$H = \frac{h1(f+S) - h2f}{h2 - h1}.$$

In an embodiment of the present invention, the target is a dynamic target, and the determining the distance between the unmanned aerial vehicle and the target according to the foregrounds respectively extracted from the two neighboring frames of images includes:

calculating a moving distance S of the target when the unmanned aerial vehicle photographs the two neighboring frames of images; and determining the distance according to at least h1, h2, f, and S, where f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

In an embodiment of the present invention, the determining the distance according to at least h1, h2, f, and S includes:

calculating the distance H between the unmanned aerial vehicle and the target according to the following formula:

$$H = \frac{f(h2 - h1) + h1S}{h1 - h2}.$$

In an embodiment of the present invention, the method further includes:

calculating a width E of the target according to the following formula:

$$E = \frac{Sh1h2}{(h1 - h2)f}.$$

In an embodiment of the present invention, the calculating a moving distance S of the target when the unmanned aerial vehicle photographs the two neighboring frames of images includes:

obtaining at least three frames of images of the target that are photographed by the unmanned aerial vehicle;

obtaining, according to the at least three frames of images of the target, a speed model for describing a motion regularity of the target; and calculating, according to the speed model, the moving distance S of the target when the unmanned aerial vehicle photographs the two neighboring frames of images.

In an embodiment of the present invention, the speed model is:

$$v = \tfrac{1}{2}kt^2 + bt + c,$$

where, t is a moving time of the target, and k, b, and c are constants.

In an embodiment of the present invention, k, b, and c are determined by using the at least three frames of images of the target.

In an embodiment of the present invention, the method further includes:

adjusting a flight attitude of the unmanned aerial vehicle, so that centers of the images fall on a straight line in which the flight direction of the unmanned aerial vehicle is located.

According to a second aspect, to resolve the technical problems of the present invention, the present invention provides a distance measurement apparatus, where the apparatus includes:

a obtaining module, configured to obtain any two neighboring frames of images that are photographed by an unmanned aerial vehicle;

an image processing module, configured to:

determine ROIs of the any two neighboring frames of images;

respectively determine enlarged ROIs of the any two neighboring frames of images according to the ROIs; and respectively segment and extract foregrounds in the enlarged ROIs, where the determining module is configured to:

determine that the unmanned aerial vehicle cannot determine a distance between the unmanned aerial vehicle and a target in a flight direction of the unmanned aerial vehicle by using a stereo matching method; and determine the distance between the unmanned aerial vehicle and the target in the flight direction of the unmanned aerial vehicle according to the foregrounds of the any two neighboring frames of images.

In an embodiment of the present invention, the determining module is configured to:

select n×n pixel units from the ROI as a cell, and calculate a sum go of grayscale values of the n×n pixel units;

select n×n cells around the cell as a block, and respectively calculate grayscale values $g_1, g_2, \ldots,$ and $g_{n*n}$ of the n×n cells in the block;

determine whether the sum of the grayscale values of the n×n pixel units and the grayscale values of the n×n cells in the block satisfy a preset condition; and if yes, determine that the unmanned aerial vehicle cannot determine the distance between the unmanned aerial vehicle and the target by using the stereo matching method.

In an embodiment of the present invention, the determining module is specifically configured to:

calculate a ratio of a sum of differences between the grayscale values of all the cells in the block and go to a size of the cell:

$$\frac{(g_1 - g_0) + (g_2 - g_0) + \ldots (g_{n \times n} - g_0)}{S_{cell}},$$

where, $S_{cell}$ is the size of the cell;

determine whether the ratio falls within a preset range; and if yes, determine that the unmanned aerial vehicle cannot determine the distance between the unmanned aerial vehicle and the target by using the stereo matching method.

In an embodiment of the present invention, a ratio of a size of the second ROI to a size of the first ROI is greater than 1.

In an embodiment of the present invention, the apparatus further includes a judging module, where the judging module is configured to:

determine whether at least two targets exist in the foreground; and if yes, determine that one of the at least two targets is a detection object; and the determining module is configured to:

determine a distance between the unmanned aerial vehicle and the detection object according to the foregrounds respectively extracted from the two neighboring frames of images.

In an embodiment of the present invention, the judging module is specifically configured to:

determine whether measurement changes of the at least two targets in the foreground are the same; and if yes, determine that a target having a highest upper edge in the foreground is the detection object.

In an embodiment of the present invention, if measurement changes of a plurality of targets in the foreground are different, the judging module is further configured to determine that a target having a largest edge measurement change in the foreground is the detection object.

In an embodiment of the present invention, the target is a static target, and the determining module is configured to:

determine the distance according to at least h1, h2, f, and S, where

S is a flight distance of the unmanned aerial vehicle when the two neighboring frames of images are photographed, f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

In an embodiment of the present invention, the determining module is specifically configured to:

calculate the distance H between the unmanned aerial vehicle and the target in the flight direction of the unmanned aerial vehicle:

$$H = \frac{h1(f + S) - h2f}{h2 - h1}.$$

In an embodiment of the present invention, the target is a dynamic target, and the determining module is configured to:

calculate a moving distance S of the target when the unmanned aerial vehicle photographs the two neighboring frames of images; and determine the distance according to at least h1, h2, f, and S, where f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

In an embodiment of the present invention, the determining module is specifically configured to:

calculate the distance H between the unmanned aerial vehicle and the target in the flight direction of the unmanned aerial vehicle:

$$H = \frac{f(h2 - h1) + h1S}{h1 - h2}.$$

In an embodiment of the present invention, the determining module is further configured to:

calculate a width E of the target according to the following formula:

$$E = \frac{Sh1h2}{(h1 - h2)f}.$$

In an embodiment of the present invention, the determining module is further configured to:

obtain at least three frames of images of the target that are photographed by the unmanned aerial vehicle;

obtain, according to the at least three frames of images of the target, a speed model for describing a motion regularity of the target; and calculate, according to the speed model, the moving distance S of the target when the unmanned aerial vehicle photographs the two neighboring frames of images.

In an embodiment of the present invention, the speed model is:

$$v = \tfrac{1}{2}kt^2 + bt + c,$$

where, t is a moving time of the target, and k, b, and c are constants.

In an embodiment of the present invention, k, b, and c are determined by using the at least three frames of images of the target.

In an embodiment of the present invention, the apparatus further includes an adjustment module, where the adjustment module is configured to adjust a flight attitude of the unmanned aerial vehicle, so that centers of the images fall on a straight line in which the flight direction of the unmanned aerial vehicle is located.

According to a third aspect, to resolve the technical problems of the present invention, the present invention further provides an unmanned aerial vehicle, including:

a housing;

an arm connected to the housing;

a processor disposed in the housing or the arms; and a memory in communication connection to the processor, the memory being disposed in the housing or the arms, where the memory stores instructions that can be executed by the processor, and the processor implements, when executing the instructions, the distance measurement method described above.

According to a fourth aspect, to resolve the technical problems of the present invention, the present invention further provides a computer-readable storage medium, where the computer-readable storage medium stores computer-executable instructions, and when the computer-executable instructions are executed by an unmanned aerial vehicle, the unmanned aerial vehicle is enabled to perform the distance measurement method described above.

According to the distance measurement method and apparatus, and the unmanned aerial vehicle provided in the embodiments of the present invention, foreground and background segmentation is performed on the two neighboring frames of images, and edge feature extraction is performed by using the enlarged ROIs to obtain the measurement changes of the images. By means of the measurement changes of the images, remote-distance obstacle avoidance in an extreme condition can be implemented, and problems such as poor stereo matching precision or unavailability of stereo matching in extreme cases such as no texture, low textures, and dense and repeated textures are resolved.

BRIEF DESCRIPTION OF THE DRAWINGS

One or more embodiments are exemplarily described by using figures that are corresponding thereto in the accompanying drawings. The exemplary descriptions do not constitute a limitation to the embodiments. Elements with same reference numbers in the accompanying drawings indicate similar elements. Unless otherwise particularly stated, the figures in the accompanying drawings do not constitute a scale limitation.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The present invention provides a distance measurement method and apparatus, and an unmanned aerial vehicle, to resolve a problem that an unmanned aerial vehicle cannot implement remote-distance obstacle avoidance due to poor stereo matching precision or unavailability of stereo matching in extreme cases in which a target in front of the unmanned aerial vehicle has no texture, low textures, or dense and repeated textures, or the like.

Figure 1:
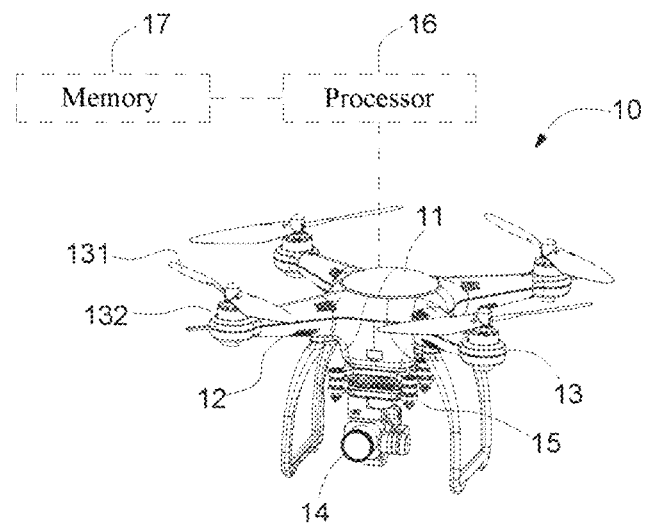
FIG. 1 is a schematic structural diagram of an unmanned aerial vehicle according to an embodiment of the present invention.

FIG. 1 is a schematic structural diagram of an unmanned aerial vehicle 10 according to an embodiment of the present invention. The unmanned aerial vehicle 10 includes a housing 11, arms 12 connected to the housing 11, a power apparatus 13 disposed at an end of each arm 12, a gimbal 15 connected to the housing 11, a camera apparatus 14 connected to the gimbal 15, and a processor 16 and a memory 17 disposed in the housing 11.

In this embodiment, there are four arms 12, that is, the aircraft is a quadrotor. In another possible embodiment, there may be three arms 12, six arms 12, eight arms 12, ten arms 12, or the like. The unmanned aerial vehicle 10 may further be another movable object such as a manned aircraft, a model airplane, an unmanned airship, a fixed-wing unmanned aerial vehicle, or an unmanned hot air balloon.

The power apparatus 13 includes a motor 132 disposed at an end of the arm 12 and a propeller 131 connected to a rotating shaft of the motor 132. Rotation of the rotating shaft of the motor 132 drives the propeller 131 to rotate to provide a lift force for the unmanned aerial vehicle 10.

The gimbal 15 is used to reduce and even eliminate vibration transferred from the power apparatus 13 to the camera apparatus 14, to ensure that the camera apparatus 14 can photograph a stable and clear image or video.

The camera apparatus 14 may be a high-definition camera, an action camera, or the like, and is configured to implement an image photographing. In an embodiment of the present invention, the camera apparatus 14 supports autonomous optical zoom. The camera apparatus 14 may be directly mounted on the unmanned aerial vehicle 10, or may be mounted on the unmanned aerial vehicle 10 by using the gimbal 15 described in this embodiment. The gimbal 15 allows the camera apparatus 14 to rotate about at least one axis relative to the unmanned aerial vehicle 10.

The processor 16 may include a plurality of functional units, for example, a flight control unit configured to control a flight attitude of the aircraft, a target identification unit configured to identify a target, a tracking unit configured to track a particular target, a navigation unit (for example, a Global Positioning System (GPS) or Beidou) configured to navigate the aircraft, and a data processing unit configured to process environment information obtained by a related onboard device (for example, the camera apparatus 14).

Figure 2:
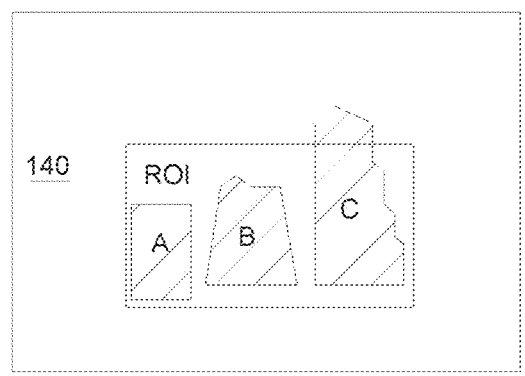
FIG. 2 is a schematic diagram of an image photographed by the unmanned aerial vehicle shown in FIG. 1, where the image includes a first ROI.

The processor 16 first obtains any two neighboring frames of images that are photographed by the unmanned aerial vehicle 10, and the processor 16 determines a first ROI of each of the two neighboring frames of images. A ROI is a region needing to be processed that is outlined from a processed image in a form of a rectangle, a circle, an ellipse, an irregular polygon, or the like during image processing. The ROI generally includes at least a part of an image of a target. FIG. 2 shows one image 140 obtained by the camera apparatus 14. A region in a box represents the first ROI, and the first ROI includes at least a part of the image of the targets (parts indicated by shaded lines in FIG. 2).

Figure 3A:
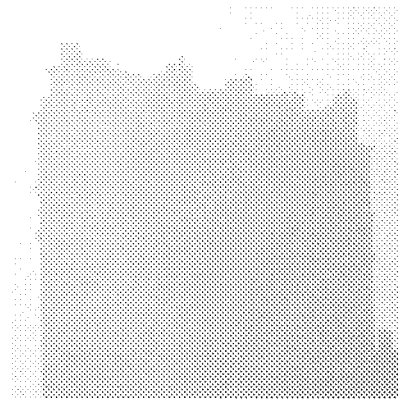
FIG. 3a is a schematic diagram showing that a target in an image photographed by the unmanned aerial vehicle shown in FIG. 1 presents no texture on foggy days.
Figure 3B:
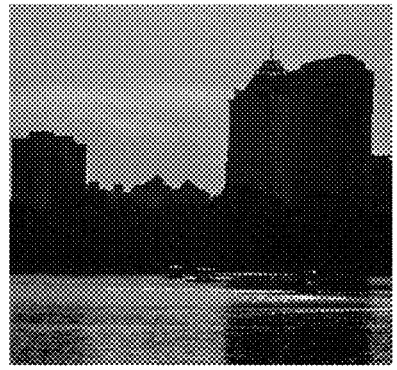
FIG. 3b is a schematic diagram showing that a target in an image photographed by the unmanned aerial vehicle shown in FIG. 1 presents low textures in a low brightness environment.
Figure 3C:
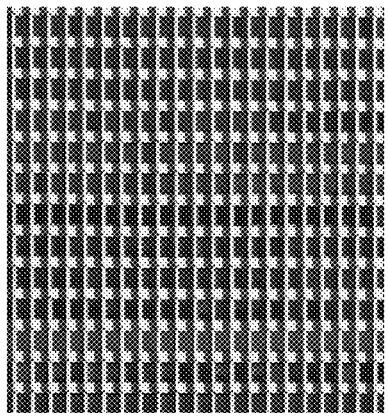
FIG. 3c is a schematic diagram showing that a target in an image photographed by the unmanned aerial vehicle shown in FIG. 1 presents dense and repeated textures in a remote distance case.

When the unmanned aerial vehicle 10 is in extreme cases in which a target on foggy days in FIG. 3a presents no texture, a target having low brightness in FIG. 3b presents low textures, a remote-distance target in FIG. 3c presents dense and repeated textures, and the like, a stereo matching method is unavailable. Stereo matching obtains information about a distance of the target relative to the unmanned aerial vehicle by using pixel information of images, searching same pixel points in two images, and then obtaining a disparity map for describing depth of field information of the points by using image positions corresponding to the same pixel points, further using a corresponding position change.

Figure 4:
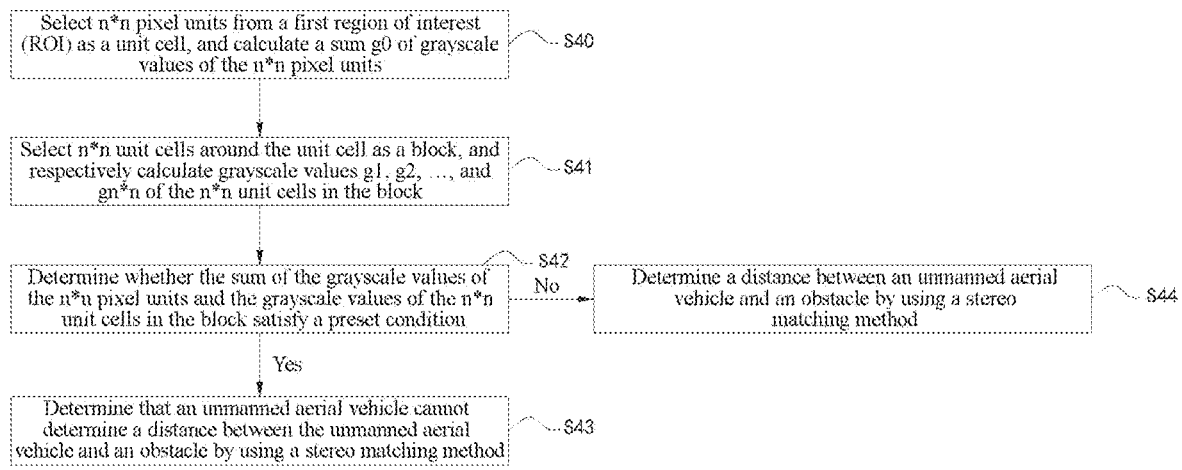
FIG. 4 is a flowchart of an embodiment in which the unmanned aerial vehicle shown in FIG. 1 determines that a relative distance between the unmanned aerial vehicle and a target in a flight direction of the unmanned aerial vehicle cannot be determined by using a stereo matching method.
Figure 5:
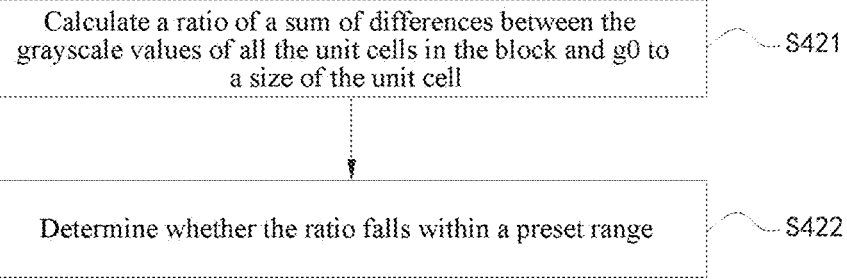
FIG. 5 is a flowchart of an embodiment in which it is determined whether a sum of grayscale values of n×n pixel units and grayscale values of n×n cells in a block satisfy a preset condition in the flowchart shown in FIG. 4.
Figure 6:
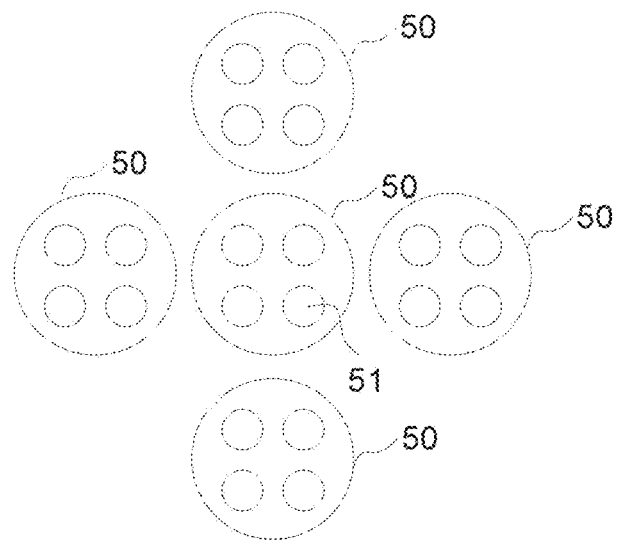
FIG. 6 is a schematic structural diagram of the cell and the block that are mentioned in the flowchart shown in FIG. 4.

The processor 16 first needs to determine that the unmanned aerial vehicle 10 is in the foregoing extreme case. As shown in FIG. 4 to FIG. 6, in an embodiment of the present invention, the processor 16 determines, by using the following method, whether the unmanned aerial vehicle 10 is in the foregoing extreme case, that is, a case in which a distance between the unmanned aerial vehicle 10 and a target in a flight direction of the unmanned aerial vehicle 10 cannot be determined by using the stereo matching method:

S40: Select n×n pixel units 51 from the first ROI as a cell 50, and calculate a sum $g_0$ of grayscale values of the n×n pixel units 51.

S41: Select n×n cells 50 around the cell 50 as a block, and respectively calculate grayscale values $g_1, g_2, \ldots,$ and $g_{n*n}$ of the n×n cells 50 in the block.

In an embodiment of the present invention, n is set to 4. In another possible embodiment, n may alternatively be set to 8, 10, 12, or the like. By selecting the cell and the block, the processor 16 may compare a difference of grayscale values of a local region in the first ROI.

S42: Determine whether the sum of the grayscale values of the n×n pixel units 51 and the grayscale values of the n×n cells 50 in the block satisfy a preset condition.

As shown in FIG. 5, in an embodiment of the present invention, the step further includes the following steps:

S421: Calculate a ratio of a sum of differences between the grayscale values of all the cells in the block and $g_0$ to a size of the cell:

$$\frac{(g_1 - g_0) + (g_2 - g_0) + \ldots (g_{n \times n} - g_0)}{S_{cell}},$$

where
$S_{cell}$ is the size of the cell.

S422: Determine whether the ratio falls within a preset range.

For example, a preset threshold λ may be given according to experience or an actual application case. When the ratio in step S421 is less than λ, it indicates that a local texture difference of the target is small, and the unmanned aerial vehicle needs to use the distance measurement method in the present invention. On the contrary, if the ratio is greater than λ, it indicates that a local texture difference of the target is relatively large, and the relative distance between the unmanned aerial vehicle and the target can be obtained by using the existing stereo matching method.

S43: If yes, determine that the unmanned aerial vehicle cannot determine the distance between the unmanned aerial vehicle and the target by using the stereo matching method.

S44: If no, determine that the unmanned aerial vehicle can determine the distance between the unmanned aerial vehicle and the target by using the stereo matching method.

By means of the foregoing steps of the method, the processor 16 can determine whether the local texture difference of the target is small enough, so as to determine whether the distance measurement method provided in this embodiment of the present invention needs to be used.

Figure 7:
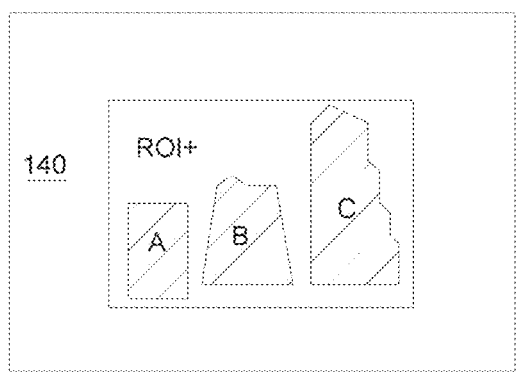
FIG. 7 is a schematic diagram of a second ROI formed after the first ROI in FIG. 2 is enlarged.

As shown in FIG. 7, after the processor 16 determines that the unmanned aerial vehicle 10 cannot determine the distance between the unmanned aerial vehicle and the target by using the stereo matching method, the first ROI of each of the two neighboring frames of images needs to be enlarged to form a second ROI. Still using the image 140 obtained by the camera apparatus 14 as an example, the region in a rectangle represents the first ROI, and the first ROI includes at least a part of the image of a target (parts indicated by shaded lines in FIG. 2). It can be learned from FIG. 6 that compared with the first ROI, the second ROI ROI+ is expanded to some extent. This is because that only local image information of a foreground (that is, the target) needs to be obtained during image matching in the ROI. However, in an obtained image photographed in a remote distance, a size of an edge feature of the foreground is generally relatively small. To robustly obtain the edge feature of the foreground in an approach flight, first, it needs to be ensured that the edge feature exists in the ROI. Therefore, the ROI is expanded to some extent and is represented as the second ROI ROI+. In addition, this embodiment of the present invention further introduces the concept of an expansion factor σ indicating a ratio of a size of the second ROI ROI+ to a size of the ROI. σ>1, and a specific value needs to be determined according to a detection range of obstacle avoidance of the unmanned aerial vehicle and a compute capability of the unmanned aerial vehicle.

After determining the second ROI of each of the two neighboring frames of images, the processor 16 further needs to perform a segmentation and extraction operation on a foreground in the second ROI, and determine whether at least two targets exist in an extracted foreground. If yes, it needs to be determined that one of the at least two targets is a detection object, and then a distance between the unmanned aerial vehicle 10 and the detection object is determined according to the foregrounds separately extracted from the two neighboring frames of images.

Figure 8:
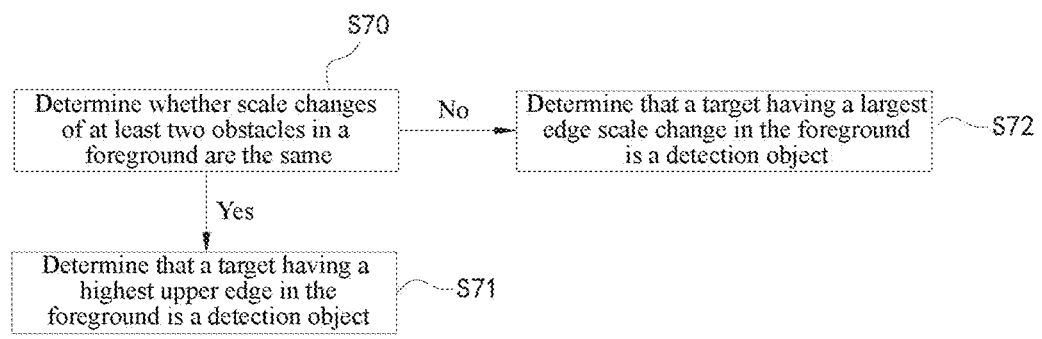
FIG. 8 is a flowchart of an embodiment in which the unmanned aerial vehicle shown in FIG. 1 determines a detection object when at least two targets exist in a foreground.

As shown in FIG. 8, in an embodiment of the present invention, when the at least two targets exist in the foreground, the processor 16 may determine the detection object according to the following steps:

S70: Determine whether measurement changes of the at least two targets in the foreground are the same.

S71: If yes, determine that a target having a highest upper edge in the foreground is the detection object.

S72: If no, determine that a target having a largest edge measurement change in the foreground is the detection object.

This is because that a more distant distance between the target and the unmanned aerial vehicle indicates a smaller corresponding edge measurement change of the target. Oppositely, a closer distance between the target and the unmanned aerial vehicle indicates a larger corresponding edge measurement change of the target. If measurement changes of all targets are the same, it indicates that distances between the targets and the unmanned aerial vehicle may be considered to be basically the same. In this case, it may be determined that the target having a highest upper edge in the foreground is the detection object (such as a target C in FIG. 6). The unmanned aerial vehicle 10 generally avoids an obstacle by elevating to a higher position. Therefore, by selecting the target having a highest upper edge, safest obstacle avoidance can be ensured.

If measurement changes of a plurality of targets are not the same (it indicates that distances between the plurality of targets and the unmanned aerial vehicle 10 are different), the target having a largest edge measurement change (a target closest to the unmanned aerial vehicle) is determined as the detection object.

After determining the detection object, the processor 16 needs to further calculate a relative distance between the target and the unmanned aerial vehicle 10.

In an embodiment of the present invention, when the target is a static target, the processor 16 may calculate the relative distance between the target and the unmanned aerial vehicle 10 according to a geometrical relationship between the two neighboring frames of images.

Figure 9:
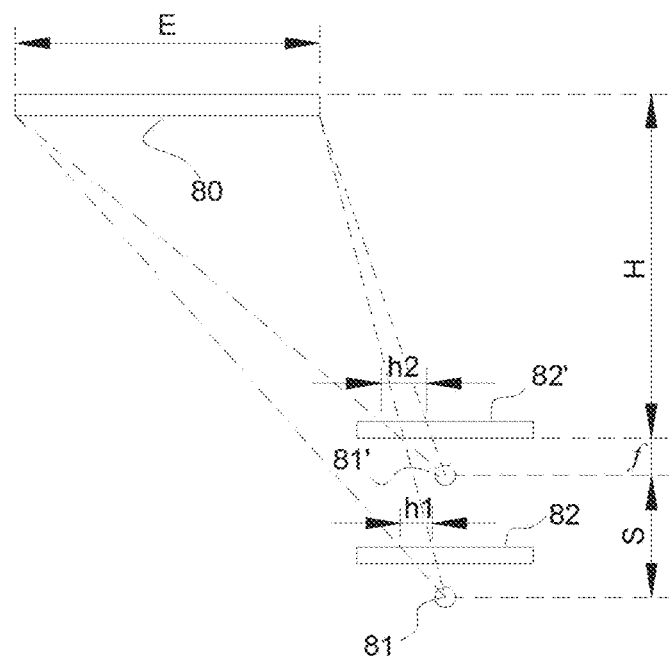
FIG. 9 is a diagram of a geometrical relationship formed by the unmanned aerial vehicle shown in FIG. 1 by photographing two neighboring frames of images when a target is a static target.

As shown in FIG. 9, assuming that an actual width of the target 80 is E, widths of the target 80 in image planes of the two neighboring frames of images of the camera apparatus of the unmanned aerial vehicle are respectively $h_1$ and $h_2$, a moving distance when the unmanned aerial vehicle 10 photographs the two neighboring frames of images, that is, when the unmanned aerial vehicle 10 moves from a position 81 to a position 81', is S, and a focal length of the camera apparatus is f, there is the following geometrical relationship:

$$\frac{h_1}{E} = \frac{f}{f+H+S} \quad (2)$$

$$\frac{h_2}{E} = \frac{f}{f+H} \quad (3)$$

For formulas (2) and (3), E and H are unknowns, and may be obtained by solving an equation:

$$H = \frac{h1(f+S) - h2f}{h2 - h1}$$

$$E = \frac{Sh1h2}{(h1-h2)f}$$

After obtaining the relative distance between the target and the unmanned aerial vehicle, the processor 16 can alert in advance according to the distance and take a corresponding obstacle avoidance policy.

Figure 10:
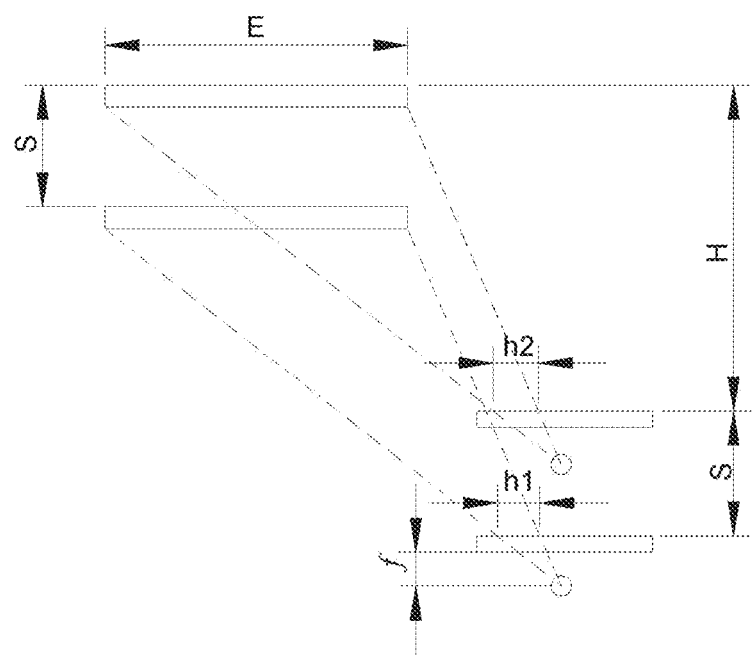
FIG. 10 is a diagram of a geometrical relationship formed by the unmanned aerial vehicle shown in FIG. 1 by photographing two neighboring frames of images when a target is a dynamic target.

In an embodiment of the present invention, when the target is a dynamic target, that is, the target is moving, the relative distance between the unmanned aerial vehicle 10 and the target may be measured by using the following method:

For a moving target, to ensure continuous tracking on the target, it is generally required that the target is at the center of the image and the measurement remains unchanged. When a tracking algorithm is robust and precise, and the real-time performance of in-vehicle hardware and the stability of a flight control apparatus can satisfy a condition of remaining in such a state, a moving distance of the target in a period of time can be obtained according to motion information of the unmanned aerial vehicle. As shown in FIG. 10, it may be obtained according to a geometrical relationship in FIG. 10:

$$\frac{h_1}{E} = \frac{f}{f+H+S_1-S} \quad (4)$$

$$\frac{h_2}{E} = \frac{f}{f+H} \quad (5)$$

It can be obtained according to $h_1 = h_2$ that the moving distance of the target in the time interval is consistent with a flight distance of the unmanned aerial vehicle.

If the state is always maintained, the relative distance between the target and the unmanned aerial vehicle cannot be obtained. Therefore, the present invention provides the following policy for the case: continuously obtaining at least three frames of images, performing distance detection once after obtaining four frames of images in an embodiment of the present invention, where the unmanned aerial vehicle remains static during detection, and a moving distance of the target in the phase is predicted by using speeds of the foregoing four frames, keeping performing the tracking algorithm, and stably obtaining target sizes of two frames of images that are before and after the detection, and then obtaining the relative distance between the target and the unmanned aerial vehicle according to the geometrical relationship.

$$\frac{h_1}{E} = \frac{f}{f+H-S} \quad (6)$$

$$\frac{h_2}{E} = \frac{f}{f+H} \qquad (7)$$

If S is known, the relative distance H between the unmanned aerial vehicle and the target and a width E of the target may be obtained by using the following formulas:

$$H = \frac{f(h2-h1) + h1S}{h1 - h2}$$

$$E = \frac{Sh1h2}{(h1-h2)f}$$

In an embodiment of the present invention, the moving distance S of the target in the detection phase is obtained by using the following method:

To make a result more common, a variable accelerated motion model is established, where an acceleration a=kt+b and then a speed model may be obtained as:

$$v = \tfrac{1}{2}kt^2 + bt + c$$

Where, t is a moving time of the target, and k, b, and c are constants.

k, b, and c may be solved according to the foregoing four frames of images and a relative distance relationship thereof.

The moving distance S of the target is solved by using the speed model and the moving time.

By means of the method, continuous solving of the relative distance between the target and the unmanned aerial vehicle can be implemented.

In this embodiment of the present invention, foreground and background segmentation is performed on the two neighboring frames of images, and edge feature extraction is performed by using the enlarged ROI to obtain the measurement changes of the images. By means of the measurement changes of the images, remote-distance obstacle avoidance in an extreme condition can be implemented, and problems such as poor stereo matching precision or unavailability of stereo matching in extreme cases such as no texture, low textures, and dense and repeated textures are resolved.

In another embodiment of the present invention, a relative distance between a moving target and the unmanned aerial vehicle may be further obtained in real time according to the distance measurement method in the present invention.

Figure 11:
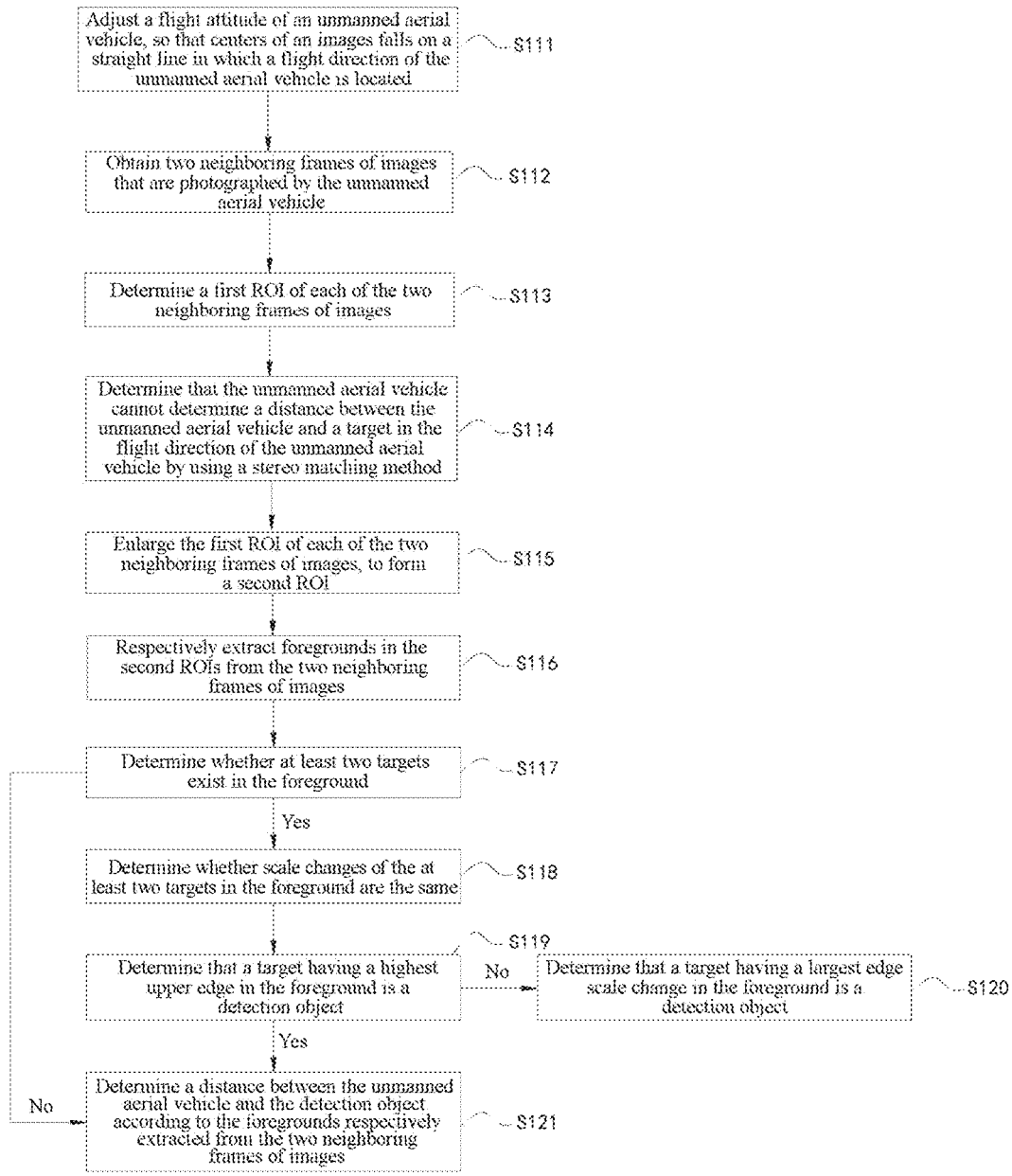
FIG. 11 is a flowchart of a distance measurement method according to an embodiment of the present invention.

As shown in FIG. 11, an embodiment of the present invention further provides a distance measurement method. The method includes the following steps.

S111: Adjust a flight attitude of an unmanned aerial vehicle, so that centers of images fall on a straight line in which a flight direction of the unmanned aerial vehicle is located.

In a flight process, the unmanned aerial vehicle should have flown in a straight direction, but an attitude change is inevitably caused by interference of wind or instability of a control system. Due to the attitude change of the unmanned aerial vehicle, centers of several frames of images may not fall on the straight line in which the flight direction of the unmanned aerial vehicle is located. Because the present invention focuses on a safety problem in the flight direction of the unmanned aerial vehicle, in this case, correction and alignment need to be performed on the images, so that the centers of the images fall on the straight line in which the flight direction of the unmanned aerial vehicle is located, and the images satisfy epipolar constraint.

S112: Obtain two neighboring frames of images that are photographed by the unmanned aerial vehicle.

S113: Determine a first ROI of each of the two neighboring frames of images.

S114: Determine that the unmanned aerial vehicle cannot determine a distance between the unmanned aerial vehicle and a target in the flight direction of the unmanned aerial vehicle by using a stereo matching method.

As shown in FIG. 4 and FIG. 5, in an embodiment of the present invention, the step further includes the following steps:

S40: Select n×n pixel units 51 from the first ROI as a cell 50, and calculate a sum $g_0$ of grayscale values of the n×n pixel units 51.

S41: Select n×n cells 50 around the cell 50 as a block, and respectively calculate grayscale values $g_1, g_2, \ldots,$ and $g_{n*n}$ of the n×n cells 50 in the block.

In an embodiment of the present invention, n is set to 4. In another possible embodiment, n may alternatively be set to 8, 10, 12, or the like. By selecting the cell and the block, the processor 16 may compare a difference of grayscale values of a local region in the first ROI.

S42: Determine whether the sum of the grayscale values of the n*n pixel units 51 and the grayscale values of the n*n cells 50 in the block satisfy a preset condition.

As shown in FIG. 5, in an embodiment of the present invention, step S42 further includes the following steps:

S421: Calculate a ratio of a sum of differences between the grayscale values of all the cells in the block and go to a size of the cell:

$$\frac{(g_1 - g_0) + (g_2 - g_0) + \ldots (g_{n \times n} - g_0)}{S_{cell}}.$$

Where, $S_{cell}$ is the size of the cell.

S422: Determine whether the ratio falls within a preset range.

For example, a preset threshold λ may be given according to experience or an actual application case. When the ratio in step S421 is less than λ, it indicates that a local texture difference of the target is small, and the unmanned aerial vehicle needs to use the distance measurement method in the present invention. On the contrary, if the ratio is greater than λ, it indicates that a local texture difference of the target is relatively large, and the relative distance between the unmanned aerial vehicle and the target can be obtained by using the existing stereo matching method.

If yes, it is determined that the unmanned aerial vehicle cannot determine the distance between the unmanned aerial vehicle and the target by using the stereo matching method.

After it is determined that the unmanned aerial vehicle cannot determine the relative distance between the unmanned aerial vehicle and the target by using the stereo matching method, next processing needs to be performed:

S115: Enlarge the first ROI of each of the two neighboring frames of images, to form a second ROI.

It can be learned from FIG. 2 and FIG. 6 that compared with the first ROI, the second ROI ROI+ is expanded to some extent. This is because that only local image information of a foreground (that is, the target) needs to be obtained during image matching in the ROI. However, in an obtained image photographed in a remote distance, a size of an edge feature of the foreground is generally relatively small. To robustly obtain the edge feature of the foreground in an approach flight, first, it needs to be ensured that the edge feature exists in the ROI. Therefore, the ROI is expanded to some extent and is represented as the second ROI ROI+. In addition, this embodiment of the present invention further introduces the concept of an expansion factor σ indicating a ratio of a size of the second ROI ROI+ to a size of the ROI. σ>1, and a specific value needs to be determined according to a detection range of obstacle avoidance of the unmanned aerial vehicle and a compute capability of the unmanned aerial vehicle.

S116: Respectively extract foregrounds in the second ROIs from the two neighboring frames of images.

S117: Determine whether at least two targets exist in the foreground; and if yes, perform step S118; or if no, perform step S121 of directly determining, when only one target exists in the foreground, that the target is a detection object.

S118: Determine whether measurement changes of the at least two targets in the foreground are the same; and if yes, perform step S119; or if no, perform step S120.

S119: Determine that a target having a highest upper edge in the foreground is the detection object.

S120: Determine that a target having a largest edge measurement change in the foreground is the detection object.

This is because that a more distant distance between the target and the unmanned aerial vehicle indicates a smaller corresponding edge measurement change of the target. Oppositely, a closer distance between the target and the unmanned aerial vehicle indicates a larger corresponding edge measurement change of the target. If measurement changes of all targets are the same, it indicates that distances between the targets and the unmanned aerial vehicle may be considered to be basically the same. In this case, it may be determined that the target having a highest upper edge in the foreground is the detection object (such as a target C in FIG. 6). The unmanned aerial vehicle 10 generally avoids an obstacle by elevating a height. Therefore, by selecting the target having a highest upper edge, safest obstacle avoidance can be ensured.

If measurement changes of a plurality of targets are not the same (it indicates that distances between the plurality of targets and the unmanned aerial vehicle 10 are different), the target having a largest edge measurement change (a target closest to the unmanned aerial vehicle) is determined as the detection object.

S121: Determine a distance between the unmanned aerial vehicle and the detection object according to the foregrounds respectively extracted from the two neighboring frames of images.

In an embodiment of the present invention, when the target is a static target, the relative distance between the target and the unmanned aerial vehicle may be calculated according to a geometrical relationship between the two neighboring frames of images.

As shown in FIG. 8, assuming that an actual width of the target 80 is E, widths of the target 80 in image planes of the two neighboring frames of images of the camera apparatus of the unmanned aerial vehicle are respectively $h_1$ and $h_2$, a moving distance when the unmanned aerial vehicle photographs the two neighboring frames of images, that is, when the unmanned aerial vehicle moves from a position 81 to a position 81', is S, and a focal length of the camera apparatus is f, there is the following geometrical relationship:

$$\frac{h_1}{E} = \frac{f}{f+H+S} \quad (2)$$

$$\frac{h_2}{E} = \frac{f}{f+H} \quad (3)$$

For formulas (2) and (3), E and H are unknowns, and may be obtained by solving an equation:

$$H = \frac{h1(f+S) - h2f}{h2 - h1}$$

$$E = \frac{Sh1h2}{(h1-h2)f}$$

After obtaining the relative distance between the target and the unmanned aerial vehicle, the unmanned aerial vehicle can alert in advance according to the distance and take a corresponding obstacle avoidance policy.

In an embodiment of the present invention, when the target is a dynamic target, that is, the target is moving, the relative distance between the unmanned aerial vehicle and the target may be measured by using the following method:

For a moving target, to ensure continuous tracking on the target, it is generally required that the target is at the center of the image and the measurement remains unchanged. When a tracking algorithm is robust and precise, and the real-time performance of in-vehicle hardware and the stability of a flight control apparatus can satisfy a condition of remaining in such a state, a moving distance of the target in a period of time can be obtained according to motion information of the unmanned aerial vehicle. As shown in FIG. 9, it may be obtained according to a geometrical relationship in FIG. 9:

$$\frac{h_1}{E} = \frac{f}{f+H+S_1-S} \quad (4)$$

$$\frac{h_2}{E} = \frac{f}{f+H} \quad (5)$$

It can be obtained according to $h_1=h_2$ that the moving distance of the target in the time interval is consistent with a flight distance of the unmanned aerial vehicle.

If the state is always maintained, the relative distance between the target and the unmanned aerial vehicle cannot be obtained. Therefore, the present invention provides the following policy for the case: continuously obtaining at least three frames of images, performing distance detection once after obtaining four frames of images in an embodiment of the present invention, where the unmanned aerial vehicle remains static during detection, and a moving distance of the target in the phase is predicted by using speeds of the foregoing four frames, keeping performing the tracking algorithm, and stably obtaining target sizes of two frames of images that are before and after the detection, and then obtaining the relative distance between the target and the unmanned aerial vehicle according to the geometrical relationship.

$$\frac{h_1}{E} = \frac{f}{f+H-S} \quad (6)$$

-continued $$\frac{h_2}{E} = \frac{f}{f+H} \quad (7)$$

If S is known, the relative distance H between the unmanned aerial vehicle and the target and a width E of the target may be obtained by using the following formulas:

$$H = \frac{f(h2-h1)+h1S}{h1-h2}$$

$$E = \frac{Sh1h2}{(h1-h2)f}$$

In an embodiment of the present invention, the moving distance S of the target in the detection phase is obtained by using the following method:

To make a result more common, a variable accelerated motion model is established, where an acceleration a=kt+b, and then a speed model may be obtained as:

$$v=\frac{1}{2}kt^2+bt+c$$

Where, t is a moving time of the target, and k, b, and c are constants.

k, b, and c may be solved according to the foregoing four frames of images and a relative distance relationship thereof.

The moving distance S of the target is solved by using the speed model and the moving time.

By means of the method, continuous solving of the relative distance between the target and the unmanned aerial vehicle can be implemented.

For detailed content of each step in the method, refer to the foregoing descriptions, and details are not described herein again.

Figure 12:
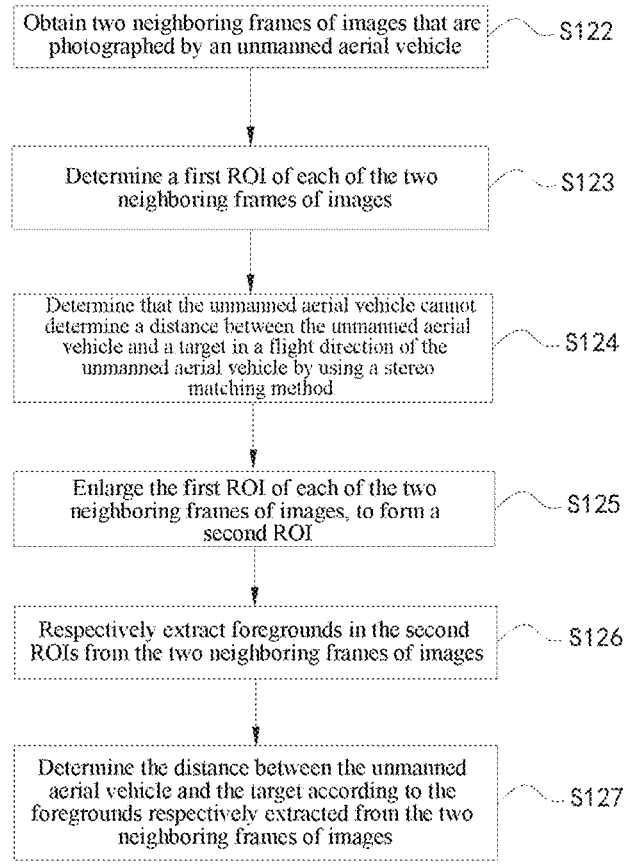
FIG. 12 is a flowchart of a distance measurement method according to another embodiment of the present invention.

As shown in FIG. 12, another embodiment of the present invention further provides a distance measurement method. The method includes the following steps.

S122: Obtain two neighboring frames of images that are photographed by an unmanned aerial vehicle.

S123: Determine a first ROI of each of the two neighboring frames of images.

S124: Determine that the unmanned aerial vehicle cannot determine a distance between the unmanned aerial vehicle and a target in a flight direction of the unmanned aerial vehicle by using a stereo matching method.

S125: Enlarge the first ROI of each of the two neighboring frames of images, to form a second ROI.

S126: Respectively extract foregrounds in the second ROIs from the two neighboring frames of images.

S127: Determine the distance between the unmanned aerial vehicle and the target according to the foregrounds respectively extracted from the two neighboring frames of images.

For detailed content of each step in the method, refer to the foregoing descriptions, and details are not described herein again.

Figure 13:
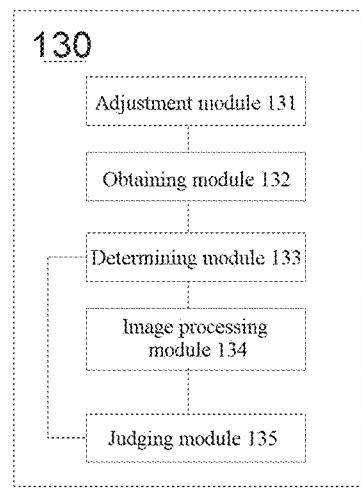
FIG. 13 is a structural block diagram of a distance measurement apparatus according to the present invention.

As shown in FIG. 13, the present invention further provides a distance measurement apparatus 130. The apparatus 130 includes:

an obtaining module 132, configured to obtain any two neighboring frames of images that are photographed by an unmanned aerial vehicle;

an image processing module 134, configured to:

determine ROIs of the any two neighboring frames of images;

respectively determine enlarged ROIs of the any two neighboring frames of images according to the ROIs; and respectively segment and extract foregrounds in the enlarged ROIs, where the determining module 133 is configured to:

determine that the unmanned aerial vehicle cannot determine a distance between the unmanned aerial vehicle and a target in a flight direction of the unmanned aerial vehicle by using a stereo matching method; and determine the distance between the unmanned aerial vehicle and the target in the flight direction of the unmanned aerial vehicle according to the foregrounds of the any two neighboring frames of images.

In an embodiment of the present invention, the determining module 133 is configured to:

select n×n pixel units from the ROI as a cell, and calculate a sum $g_0$ of grayscale values of the n×n pixel units;

select n×n cells around the cell as a block, and respectively calculate grayscale values $g_1, g_2, \ldots,$ and $g_{n*n}$ of the n×n cells in the block;

determine whether the sum of the grayscale values of the n×n pixel units and the grayscale values of the n×n cells in the block satisfy a preset condition; and if yes, determine that the unmanned aerial vehicle cannot determine the distance between the unmanned aerial vehicle and the target by using the stereo matching method.

In an embodiment of the present invention, the determining module 133 is specifically configured to:

calculate a ratio of a sum of differences between the grayscale values of all the cells in the block and $g_0$ to a size of the cell:

$$\frac{(g_1-g_0)+(g_2-g_0)+\ldots(g_{n\times n}-g_0)}{S_{cell}},$$

where $S_{cell}$ is the size of the cell;

determine whether the ratio falls within a preset range; and if yes, determine that the unmanned aerial vehicle cannot determine the distance between the unmanned aerial vehicle and the target by using the stereo matching method.

In an embodiment of the present invention, a ratio of a size of the second ROI to a size of the first ROI is greater than 1.

In an embodiment of the present invention, the apparatus 130 further includes a judging module 135, where the judging module 135 is configured to:

determine whether at least two targets exist in the foreground; and if yes, determine that one of the at least two targets is a detection object; and the determining module 133 is configured to:

determine a distance between the unmanned aerial vehicle and the detection object according to the foregrounds respectively extracted from the two neighboring frames of images.

In an embodiment of the present invention, the judging module 135 is specifically configured to:

determine whether measurement changes of the at least two targets in the foreground are the same; and if yes, determine that a target having a highest upper edge in the foreground is the detection object.

In an embodiment of the present invention, if measurement changes of a plurality of targets in the foreground are different, the judging module 135 is further configured to determine that a target having a largest edge measurement change in the foreground is the detection object.

In an embodiment of the present invention, the target is a static target, and the determining module 133 is configured to:

determining the distance according to at least h1, h2, f, and S, where

S is a flight distance of the unmanned aerial vehicle when the two neighboring frames of images are photographed, f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

In an embodiment of the present invention, the determining module 133 is specifically configured to:

calculate the distance H between the unmanned aerial vehicle and the target in the flight direction of the unmanned aerial vehicle:

$$H = \frac{h1(f+S) - h2f}{h2 - h1}.$$

In an embodiment of the present invention, the target is a dynamic target, and the determining module 133 is configured to:

calculate a moving distance S of the target when the unmanned aerial vehicle photographs the two neighboring frames of images; and determine the distance according to at least h1, h2, f, and S, where f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

In an embodiment of the present invention, the determining module 133 is specifically configured to:

calculate the distance H between the unmanned aerial vehicle and the target in the flight direction of the unmanned aerial vehicle:

$$H = \frac{f(h2 - h1) + h1S}{h1 - h2}.$$

In an embodiment of the present invention, the determining module 133 is further configured to:

calculate a width E of the target according to the following formula:

$$E = \frac{Sh1h2}{(h1 - h2)f}.$$

In an embodiment of the present invention, the determining module 133 is further configured to:

obtain at least three frames of images of the target that are photographed by the unmanned aerial vehicle;

obtain, according to the at least three frames of images of the target, a speed model for describing a motion regularity of the target; and calculate, according to the speed model, a moving distance S of the target when the unmanned aerial vehicle photographs the two neighboring frames of images.

In an embodiment of the present invention, the speed model is:

$$v = \tfrac{1}{2}kt^2 + bt + c.$$

Where, t is a moving time of the target, and k, b, and c are constants.

In an embodiment of the present invention, k, b, and c are determined by using the at least three frames of images of the target.

In an embodiment of the present invention, the apparatus 130 further includes an adjustment module 131, where the adjustment module 131 is configured to adjust a flight attitude of the unmanned aerial vehicle, so that centers of the images fall on a straight line in which the flight direction of the unmanned aerial vehicle is located.

For detailed content of each module in the apparatus, refer to the foregoing descriptions, and details are not described herein again.

The present invention further provides a computer-readable storage medium storing a computer program. When the computer program is executed by a processor, the processor is enabled to perform the method described in the embodiment shown in FIG. 11 or FIG. 12.

The apparatus embodiment described above is merely exemplary. The units described as separate parts may or may not be physically separate, and parts displayed as units may or may not be physical units, that is, may be located in one location, or may be distributed on a plurality of network units. Some or all of the modules may be selected according to actual requirements to achieve the objectives of the solutions of the embodiments.

By means of the descriptions in the foregoing implementations, persons of ordinary skill in the art may clearly understand that each implementation may be accomplished through software plus a universal hardware platform, or certainly, may be accomplished through hardware. Persons of ordinary skill in the art may understand that all or some of the processes of the methods in the embodiments may be implemented by a computer program instructing relevant hardware. The program may be stored in a computer-readable storage medium. When the program is executed, the processes of the methods in the foregoing embodiments may be included. The storage medium may be a magnetic disk, an optical disc, a read-only memory (ROM), a random access memory (RAM), or the like.

At last, it should be noted that the foregoing embodiments are merely intended to describe the technical solutions of the present invention rather than limit the technical solutions of the present invention. In the spirit of the present invention, technical features between the foregoing embodiments or different embodiments may be combined, steps may be performed in any sequence, and many other changes of the foregoing descriptions in different aspects of the present invention exist. For brevity, the changes are not provided in detail. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A distance measurement method, wherein the method comprises:
    obtaining two neighboring frames of images that are photographed by the unmanned aerial vehicle;
    determining a first region of interest (ROI) of each of the two neighboring frames of images;
    determining that an unmanned aerial vehicle cannot determine a distance between the unmanned aerial vehicle and a target in a flight direction of the unmanned aerial vehicle by using a stereo matching method;
    enlarging the first ROI of each of the two neighboring frames of images, to form a second ROI;
    respectively extracting foregrounds in the second ROIs from the two neighboring frames of images; and
    determining the distance between the unmanned aerial vehicle and the target according to the foregrounds respectively extracted from the two neighboring frames of images;
    wherein the method further comprises:
    determining whether at least two targets exist in the foreground; and
    if yes, determining that one of the at least two targets is a detection object; and
    the determining the distance between the unmanned aerial vehicle and the target according to the foregrounds respectively extracted from the two neighboring frames of images comprises:
    determining a distance between the unmanned aerial vehicle and the detection object according to the foregrounds respectively extracted from the two neighboring frames of images.

2. The method according to claim 1, wherein the determining that the unmanned aerial vehicle cannot determine a distance between the unmanned aerial vehicle and a target by using a stereo matching method comprises:
    selecting n×n pixel units from the first ROI as a cell, and calculating a sum $g_0$ of grayscale values of the n×n pixel units;
    selecting n×n cells around the cell as a block, and respectively calculating grayscale values $g_1, g_2, \ldots,$ and $g_{n*n}$ of the n×n cells in the block;
    determining whether the sum of the grayscale values of the n×n pixel units and the grayscale values of the n×n cells in the block satisfy a preset condition; and
    if yes, determining that the unmanned aerial vehicle cannot determine the distance between the unmanned aerial vehicle and the target by using the stereo matching method.

3. The method according to claim 2, wherein the determining whether the sum of the grayscale values of the n×n pixel units and the grayscale values of the n×n cells in the block satisfy a preset condition comprises:
    calculating a ratio of a sum of differences between the grayscale values of all the cells in the block and $g_0$ to a size of the cell:

$$\frac{(g_1 - g_0) + (g_2 - g_0) + \ldots (g_{n \times n} - g_0)}{S_{cell}},$$

wherein Scell is the size of the cell;

determining whether the ratio falls within a preset range; and
    if yes, determining that the unmanned aerial vehicle cannot determine the distance between the unmanned aerial vehicle and the target by using the stereo matching method.

4. The method according to claim 1, wherein a ratio of a size of the second ROI to a size of the first ROI is greater than 1.

5. The method according to claim 1, wherein the determining that one of the at least two targets is a detection object comprises:
    determining whether measurement changes of the at least two targets in the foreground are the same; and
    if yes, determining that a target having a highest upper edge in the foreground is the detection object.

6. The method according to claim 5, wherein the method further comprises:
    if the measurement changes of the at least two targets in the foreground are different, determining that a target having a largest edge measurement change in the foreground is the detection object.

7. The method according to claim 1, wherein the target is a static target, and the determining the distance between the unmanned aerial vehicle and the target according to the foregrounds respectively extracted from the two neighboring frames of images comprises:
    determining the distance according to at least h1, h2, f, and S, wherein S is a flight distance of the unmanned aerial vehicle when the two neighboring frames of images are photographed, f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

8. The method according to claim 7, wherein the determining the distance according to h1, h2, f, and S comprises:
    calculating the distance H between the unmanned aerial vehicle and the target according to the following formula:

$$H = \frac{h1(f+S) - h2f}{h2 - h1}.$$

9. The method according to claim 8, wherein the method further comprises:
    calculating a width E of the target according to the following formula:

$$E = \frac{Sh1h2}{(h1 - h2)f}.$$

10. The method according to claim 1, wherein the target is a dynamic target, and the determining the distance between the unmanned aerial vehicle and the target according to the foregrounds respectively extracted from the two neighboring frames of images comprises:
    calculating a moving distance S of the target when the unmanned aerial vehicle photographs the two neighboring frames of images; and determining the distance according to at least h1, h2, f, and S, wherein f is a focal length of a camera apparatus of the unmanned aerial vehicle, h1 is a width of the target in an image plane of the camera apparatus when the unmanned aerial vehicle photographs one of the two neighboring frames of images, and h2 is a width of the target in an image plane of the camera apparatus when the unmanned aerial vehicle photographs the other frame of image.

11. The method according to claim 10, wherein the determining the distance according to at least h1, h2, f, and S comprises:
calculating the distance H between the unmanned aerial vehicle and the target according to the following formula:

$$H = \frac{f(h2 - h1) + h1S}{h1 - h2}.$$

12. The method according to claim 11, wherein the method further comprises:
calculating a width E of the target according to the following formula:

$$E = \frac{Sh1h2}{(h1 - h2)f}.$$

13. The method according to claim 11, wherein the calculating a moving distance S of the target when the unmanned aerial vehicle photographs the two neighboring frames of images comprises:
obtaining at least three frames of images of the target that are photographed by the unmanned aerial vehicle;
obtaining, according to the at least three frames of images of the target, a speed model for describing a motion regularity of the target; and
calculating, according to the speed model, the moving distance S of the target when the unmanned aerial vehicle photographs the two neighboring frames of images.

14. The method according to claim 13, wherein the speed model is:

$$v = \frac{1}{2}kt^2 + bt + c,$$

wherein t is a moving time of the target, and k, b, and c are constants.

15. The method according to claim 14 wherein k, b, and c are determined by using the at least three frames of images of the target.

16. The method according to claim 1, wherein the method further comprises:
adjusting a flight attitude of the unmanned aerial vehicle, so that centers of the images fall on a straight line in which the flight direction of the unmanned aerial vehicle is located.

* * * * *